United States Patent
Borelli

(10) Patent No.: US 12,431,736 B2
(45) Date of Patent: Sep. 30, 2025

(54) SELF-POWERED SENSOR UNIT FOR FOOD PACKAGING MACHINE

(71) Applicant: Tetra Laval Holdings & Finance S.A., Pully (CH)

(72) Inventor: Gabriele Borelli, Spilamberto (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 28 days.

(21) Appl. No.: 17/999,622

(22) PCT Filed: May 21, 2021

(86) PCT No.: PCT/EP2021/063628
§ 371 (c)(1),
(2) Date: Nov. 22, 2022

(87) PCT Pub. No.: WO2021/239612
PCT Pub. Date: Dec. 2, 2021

(65) Prior Publication Data
US 2023/0238827 A1    Jul. 27, 2023

(30) Foreign Application Priority Data
May 26, 2020 (EP) .................................... 20176590

(51) Int. Cl.
*H02J 50/10* (2016.01)
*H02J 50/00* (2016.01)

(52) U.S. Cl.
CPC ............ *H02J 50/10* (2016.02); *H02J 50/001* (2020.01)

(58) Field of Classification Search
CPC .................................. H02J 50/001; H02J 50/10
See application file for complete search history.

(56) References Cited

U.S. PATENT DOCUMENTS

2012/0256492 A1   10/2012   Zhen et al.
2014/0008989 A1*  1/2014   Bommer .................. H02J 50/20
                                                                    307/104
(Continued)

FOREIGN PATENT DOCUMENTS

EP         3595167          1/2020
JP      2016197965 A       11/2016
(Continued)

OTHER PUBLICATIONS

International Search Report and Written Opinion of PCT/EP2021/063628, Dated Jul. 20, 2021in 10 pages.

*Primary Examiner* — Rexford N Barnie
*Assistant Examiner* — Joseph N Inge
(74) *Attorney, Agent, or Firm* — Knobbe, Martens, Olson & Bear, LLP

(57) ABSTRACT

A sensor unit (10) is configured to be mounted in the vicinity of an electric motor (20) in a food packaging machine. The sensor unit comprises: at least one sensor device configured to generate sensor data representative of an environmental parameter of the food packaging machine, a wireless transmitter for transmitting the sensor data, and a power source for providing energy to the at least one sensor device and the wireless transmitter. The sensor unit (10) provides for ease of installation and maintenance by being self-powered through energy harvesting of a magnetic field (B1, B2) generated by the electric motor (20), by use of at least one receiving coil in the power source.

16 Claims, 3 Drawing Sheets

(56) References Cited

U.S. PATENT DOCUMENTS

| | | | |
|---|---|---|---|
| 2014/0042876 A1 | 2/2014 | Brockerhoff et al. | |
| 2016/0352148 A1* | 12/2016 | Ichikawa | H02J 50/12 |
| 2017/0208597 A1* | 7/2017 | Gollakota | H04W 24/08 |
| 2017/0271910 A1 | 9/2017 | Lazaro et al. | |
| 2018/0328668 A1* | 11/2018 | Gorczyca | F27D 11/10 |
| 2018/0331586 A1* | 11/2018 | Hao | H04B 5/266 |
| 2019/0234227 A1 | 8/2019 | McConkey | |
| 2020/0235608 A1* | 7/2020 | LaFayette | H02K 11/0094 |
| 2020/0251912 A1* | 8/2020 | Dvorsky | H02J 50/80 |
| 2021/0099119 A1* | 4/2021 | Sun | B65G 35/06 |
| 2021/0143759 A1* | 5/2021 | Lu | H02N 2/181 |

FOREIGN PATENT DOCUMENTS

| | | |
|---|---|---|
| WO | WO 2019/079213 | 4/2019 |
| WO | WO 2020064533 A1 | 4/2020 |

\* cited by examiner

SELF-POWERED SENSOR UNIT FOR FOOD PACKAGING MACHINE

TECHNICAL FIELD

The present disclosure generally relates to systems or plants for production of packaged food products, and in particular to gathering of sensor data in such systems or plants.

BACKGROUND ART

Industrial production and packaging of food is automated and involves advanced process control of food packaging machines to achieve high-volume production. Safe and reliable operation of the food packaging machines is of great significance since operational failures and ensuing production standstills may have a profound impact on production cost and product quality. Early detection of operational failures is critical in avoiding performance degradation and damage to the machinery or human life. There is thus a general need for accurate condition monitoring of food packaging machines to help operators take the right decisions on emergency actions and preventive service and repair.

Data collection may be automated by installation of wireless sensor units in the food packaging machines. The sensor units may be configured to sense any suitable environmental parameter(s) and wirelessly transmit corresponding sensor data for receipt by a central or local computer which is configured to perform the condition monitoring based on the sensor data. To avoid electrical wiring, the sensor units should be self-powered. Typically, wireless sensor units are powered by a local battery. However, batteries have limited life, and the sensor units or batteries need to be serviced by replacement or recharging. This is a labor-intensive task and may require undesirable and costly production stops. Further, batteries may be depleted at different times, calling for frequent service of the sensor system.

It is known in the art to provide low-power electronic sensor systems with small photo-voltaic (PV) modules for harvesting light energy. However, PV modules are not suitable for indoor use, for example in factories. It is also known in the art to configure a low-power sensor unit to harvest (or "scavenge") energy from vibrations or temperature gradients. These sensor units are less suitable in installation locations where vibrations and heat dissipation may be low or even undesirable. Such installation locations may exist in food packaging machines.

SUMMARY

It is an objective to at least partly overcome one or more limitations of the prior art.

One objective is to provide a self-powered sensor unit for use in food packaging machines comprising one or more electric motors.

A further objective is to provide a self-powered sensor unit for use in a conveyor system for a food packaging machine.

One or more of these objectives, as well as further objectives that may appear from the description below, are at least partly achieved by a sensor unit, a system, and a food packaging machine according to the independent claims, embodiments thereof being defined by the dependent claims.

A first aspect of the present disclosure is a sensor unit for mounting in vicinity of an electric motor in a food packaging machine. The sensor unit comprises at least one sensor device configured to generate sensor data representative of an environmental parameter of the food packaging machine; a wireless transmitter for transmitting the sensor data; and a power source for providing energy to the at least one sensor device and the wireless transmitter. The power source comprises at least one receiving coil configured to harvest energy from a magnetic field generated by the electric motor.

In some embodiments, the at least one receiving coil is connected to a storage for at least part of the energy harvested from the magnetic field.

In some embodiments, the sensor unit is configured to have a maximum power consumption of less than 100 W, 10 W, 5 W, 1 W or 0.5 W.

In some embodiments, the storage comprises a supercapacitor.

In some embodiments, the power source comprises at least one rectifier connected to the at least one receiving coil to generate a first DC voltage, and a DC-to-DC power converter configured to convert the first DC voltage to a predefined second DC voltage.

In some embodiments, the DC-to-DC power converter is a buck converter.

In some embodiments, the sensor unit further comprises at least one mounting surface for attachment to the food packaging machine in the vicinity of the electric motor.

In some embodiments, the mounting surface is configured to, when the mounting surface is attached to the food packaging machine, substantially arrange a first symmetry axis of the at least one receiving coil in parallel with, and preferably in alignment with, a second symmetry axis of a drive coil in the electric motor.

In some embodiments, the mounting surface is defined by a flexible PCB containing the at least one receiving coil.

In some embodiments, the power source is configured to harvest the energy from at least one of a first magnetic field radiated by a drive coil in the electric motor or a second magnetic field radiated by a controller of the electric motor.

In some embodiments, the controller is configured to repeatedly energize and deenergize the drive coil.

In some embodiments, the power source is configured to harvest energy from the magnetic field over a contiguous range of frequencies of the magnetic field.

In some embodiments, the range of frequencies is at least 10 Hz, 100 Hz, 1 kHz, 10 kHz or 100 kHz.

In some embodiments, the power source is configured and operated independently of the electric motor.

In some embodiments, the at least one receiving coil is implemented on a PCB.

In some embodiments, the environmental parameter comprises one or more of acceleration, speed, vibration, temperature, humidity, electric voltage, electric current, torque, force, concentration, conductivity, pressure, flow rate, heat, smoke, energy, and power.

A second aspect of the present disclosure is a system for installation in a food packaging machine. The system comprises an electric motor and a sensor unit, which is separate from the electric motor and configured in accordance with the first aspect or any of its embodiments.

In some embodiments, the system comprises a conveyor, which defines a track and comprises a cart configured for movement along the track, the electric motor comprising a plurality of drive coils which are fixedly arranged along the track and are operable to generate a respective magnetic field to move the cart along the track, wherein the sensor unit is configured for attachment to the cart.

A third aspect of the present disclosure is a food packaging machine, comprising an electric motor and a sensor unit, the sensing unit being separate from the electric motor and configured in accordance with the first aspect or any of its embodiments.

Still other objectives, features and aspects, as well as advantages and technical effects will appear from the following detailed description and the drawings.

BRIEF DESCRIPTION OF THE DRAWINGS

Embodiments will now be described, by way of example, with reference to the accompanying schematic drawings.

DETAILED DESCRIPTION

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention. As used herein, the term "and/or" comprises any and all combinations of one or more of the associated listed items.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure.

Well-known functions or constructions may not be described in detail for brevity and/or clarity. Unless otherwise defined, all terms (including technical and scientific terms) used herein have the same meaning as commonly understood by one of ordinary skill in the art to which this disclosure belongs.

As used herein, the term "food product" comprises any substance that can be used or prepared for use as food by humans or animals. Such food products include, without limitation, beverages, dairy products, sauces, oils, creams, custards, soups, purées, broths, vegetables, desserts, mayonnaise, wine, pet food, whey powder, etc.

Like reference signs refer to like elements throughout.

Figure 1:
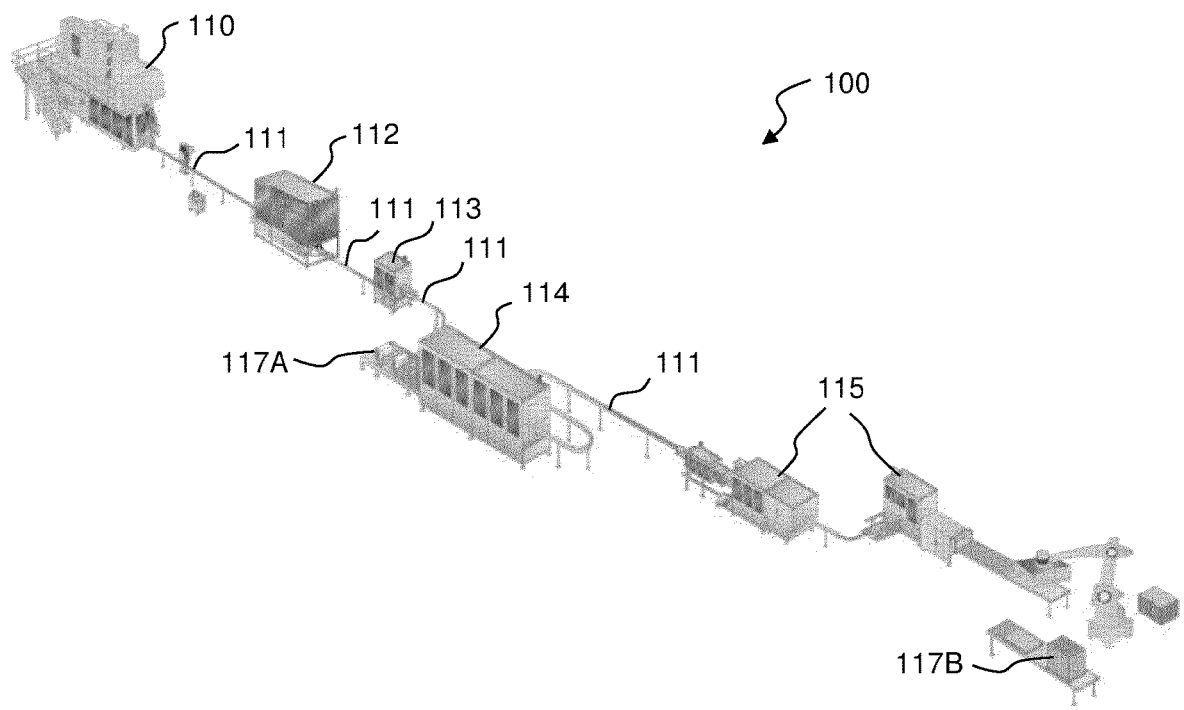
FIG. 1 is a perspective view of an example assembly of machines for production of packaged food products.

FIG. 1 is a schematic overview of an exemplifying production plant or system 100 which is configured to produce packaged food products. The food products are packaged in sealed containers or packages, which may be at least partly made of a paperboard material or a plastic material. For example, the container may be a carton or a bottle, which are well-known in the art. In the illustrated example, the system 100 comprises a sequence of packaging machines 110, 112, 113, 114 and 115 connected by conveyors 111 for transporting packages from one machine to the next. A filling machine 110 is configured to fill a food product into containers and seal the container. An accumulator machine 112 is configured to, if necessary, accumulate packages produced by the filling machine 110. A capping machine (not shown) may be configured to attach capping devices to the containers, for example downstream or upstream the filling machine 110, or a capping station may be integrated into the filing machine 110. In the illustrated example, a straw application machine 113 is configured to attach a straw to the respective container. A wrapping machine 114 is configured to arrange the containers in groups and enclose each group of containers in wrapping material, e.g. stretch foil or shrink foil, to produce a wrapped container group 117A. A cardboard packing machine 115 is configured to arrange groups of containers in cardboard trays or cardboard cartons 117B and optionally also apply a wrapping material thereto.

The present disclosure addresses the problem of providing power to sensor units in food packaging machines, including the machines described above. The sensor units may be installed as part of a data collection system. The sensor units may be configured to monitor one or more parameters representing a property of the surroundings of the sensor unit. Such parameters are denoted "environmental parameters" herein. In some embodiments, the sensor unit comprises one or more sensor devices (or "sensors") configured to measure at least one or acceleration, speed, vibration, temperature, humidity, electric voltage, electric current, torque, force, concentration, conductivity, pressure, flow rate, heat, smoke, energy, and power. Such sensor devices are readily available and well-known in the art and will not be described in further detail.

In one example, the data collection system may be configured to perform condition monitoring, by analyzing the measured environmental parameter(s) to infer the status of components of the packaging machine and possibly predict a future component failure.

Embodiments described herein are based on the insight that electric motors are ubiquitous in food packaging machines and, when active, typically radiate considerable energy into the surrounding space in the form of a magnetic field. Further, it is generally desirable to install sensor units in food packaging machines to monitor the operation of these electric motors, properties of their surroundings, the operation of components driven into motion by the electric motors, etc. Installation of sensor units in the vicinity of electric motors opens up the opportunity to exploit the electromagnetic energy available at the location of the sensor unit to make the sensor units self-powered. This may be achieved by providing the sensor units with circuitry for harvesting energy from surrounding magnetic fields, denoted electromagnetic-based energy harvesting (EEH) herein. Embodiments are also based on the insight that the power consumption of sensor units is quite limited. Typically, the maximum power consumption of a sensor unit is less than 100 W, and typically considerably less, such as less than 10 W, 5 W, 1 W or 0.5 W. Further, the power consumption may be quite intermittent, typically peaking when data is transmitted from the sensor unit, which means that the EEH need not be highly optimized and efficient but could be implemented to continuously harvest a small amount of energy from electromagnetic noise sufficient to power the sensor units at the intermittent peaks of power consumption.

An electric motor is an electrical machine that converts electrical energy into mechanical energy. An electric motor comprises a static part, denoted "stator", and a moveable part, denoted "rotor". In some implementations, the rotor comprises one or more coils, which interact with the magnetic field of the stator to generate the forces that drive the rotor. In other implementations, the rotor comprises one or more permanent magnets, and the stator comprises one or more coils. Electric motors may be powered by direct current (DC) sources or by alternating current (AC) sources. Electric motors may be classified by considerations such as power source type, internal construction, application and type of motion output. In addition to AC versus DC types, motors may be brushed or brushless, may be of various phase (for example, single-phase, two-phase, or three-phase), and may be of rotary type or linear type. As used herein, "electric motor" includes not only the actuator that is configured to convert electrical current into a motive force, for example the above-mentioned combination of stator and rotor, but also the controller that is configured to supply the drive current to the actuator.

The working principle of EEH relies on Faraday's law of induction, which states that a wire loop placed inside a magnetic field will acquire an electromotive force (EMF). The electromotive force for a coil comprising N wire loops is given by:

$$\varepsilon = -N \cdot \frac{\partial \Phi_B}{\partial t}$$

where $\varepsilon$ is the electromotive force and $\Phi_B$ is the magnetic flux through the closed surface defined by the wire loops.

The energy radiated by an electric motor in the form of a magnetic field B follows Ampere's law:

$$\oint_C B \cdot dl = \mu_0 \cdot \iint_S J \cdot dS$$

where the left-hand expression is the circular integral of the magnetic field B along a closed curve $C$, and the right-hand expression is a surface integral of the current density J on a surface S enclosed by the curve $C$.

The foregoing equations illustrate a relationship between harvested energy and operation of the electric motor. Ampere's law implies that the generated magnetic field increases with the current drawn by the drive coil in the electric motor, and Faraday's law of induction implies that the generated electromotive force in an energy harvesting coil increases with the first derivative of the magnetic flux through the energy harvesting coil. This means that electric motors that are controlled by repeatedly switching the electrical current to their drive coils on and off may be particularly suitable for EEH. Such electric motors include BLDC (Brushless DC motors) and linear motors. However, EEH may be effective in relation to any type of AC or DC motor.

Figure 2:
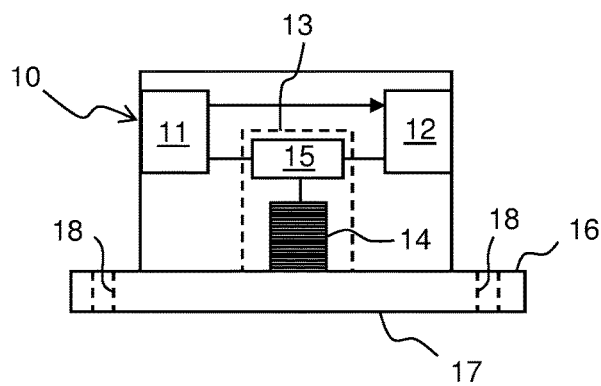
FIG. 2 is an elevated side view of an example sensor unit for installation in a food packaging machine.

FIG. 2 is a schematic side view of an example sensor unit 10 in accordance with an embodiment. The sensor unit 10 comprises a housing containing internal components, which are also shown in FIG. 2. A sensor device 11 is arranged in the housing and is configured to measure one or more environmental parameters. A wireless transmitter 12 is configured to receive sensor data (indicated by arrow) from the sensor device 11 and transmit a wireless signal representative of the sensor data. The transmitter 12 may be configured in accordance with any relevant wireless communication technology, which may be proprietary or standardized. In some embodiments, the transmitter 12 is configured to transmit wireless signals in accordance with any WWAN/WLAN/WPAN standard, for example Bluetooth or BLE, any communication standard based on IEEE 802.15.4 such as Zigbee, Thread, ISA100.11a or Wireless HART, any communication standard based on IEEE 802.11 such as WiFi, any communication standard based on IEEE 802.16 such as WiMAX, or any cellular communication standard, for example as proposed for IoT devices. In some embodiments, the transmitter 12 is a low-power device.

The sensor unit 10 further comprises a power source 13 which is configured for EEH. The EEH power source 13 comprises a coil system 14, which is configured to harvest energy from a time-varying magnetic field. The coil system 14 comprises one or more receiving coils which may or may not be wound around a core of ferromagnetic or ferrimagnetic material. The EEH power source 13 further comprises an energy storage 15, which is connected to receive and store at least part of the energy that is harvested by the coil system 14. For example, the energy storage 15 may comprise a battery, a capacitor, a supercapacitor, etc. As shown, the EEH power source 13 is electrically connected to supply energy to the sensor device 11 and the transmitter 12.

Although not shown in the example of FIG. 2, the sensor unit 10 may comprise further components, such as an I/O interface, one or more indicator lamps, a processor, computer memory, a wireless receiver, etc. It is also to be understood that the sensor unit 10 may comprise more than one sensor device 11 and/or transmitter 12.

The sensor unit 10 in FIG. 2 further comprises a mounting structure 16, in this example a mounting plate. The mounting structure 16 defines a mounting surface 17 for attachment to, for example in abutment with, a corresponding surface portion in the packaging machine. The mounting surface 17 may but need not be planar as shown. In the illustrated example, through-holes 18 are defined in the mounting structure 16 for insertion of fasteners (screws, bolts, rivets, etc.) to be engaged with the packaging machine. In a variant, the sensor unit 12 may be attached to the packaging machine by glue or adhesive, or by use of an external fixture or clamp.

It is realized that the mounting structure 16 enables a well-defined positioning of the coil system 14 in relation to an electric motor in the packaging machine.

Figure 3:
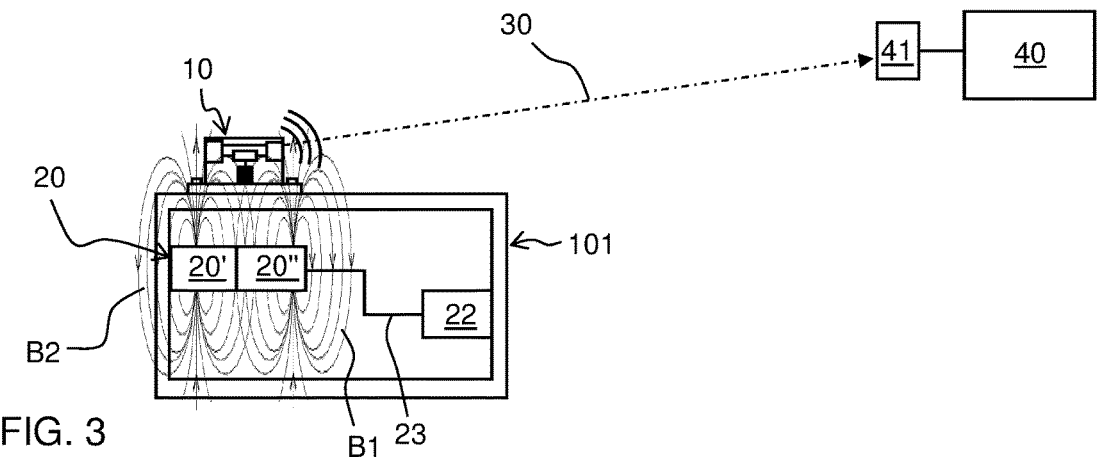
FIG. 3 is a side view of an example data collection system including the sensor unit in FIG. 2 installed in a food packaging machine.

FIG. 3 illustrates a sensor unit 10 as installed on a machine part 101 in a packaging machine. In the illustrated example, the sensor unit 10 has been bolted onto the machine part 101 above an electric motor 20, which comprises a controller part 20' for generating a drive current, and an actuator part 20" that converts the drive current to a motive force which is transferred to a component 22 of the packaging machine, for example via a mechanical transmission 23. When energized, the actuator part 20" radiates a first magnetic field B1. In the illustrated example, the controller part 20' radiates a second magnetic field B2 when generating the drive current for the actuator part 20". The sensor unit 10 may be arranged to harvest energy from both or one of the first and second magnetic fields B1, B2. The first magnetic field B1 may be more generally available for EEH from electric motors. However, second magnetic field B2 may be suitable for EEH at least when the controller part 20' comprises control electronics that repeatedly switch high currents on and off, for example by use of one or more MOSFET devices.

In the example of FIG. 3, the wireless transmitter 12 is activated to transmit a wireless signal 30 for receipt by a wireless receiver 41, which may be arranged in the production plant. The wireless signal 30 may comprise an identifier of the sensor unit 10 and measurement data corresponding to sensor data measured by the sensor unit 10. The receiver 41 is connected to a computer 40, which may retrieve the measurement data from the wireless signal 30. The computer 40 may store and/or analyze the measurement data, for example for condition monitoring. If a current or future fault condition is detected, the computer 40 may signal a need for service.

Figure 4:
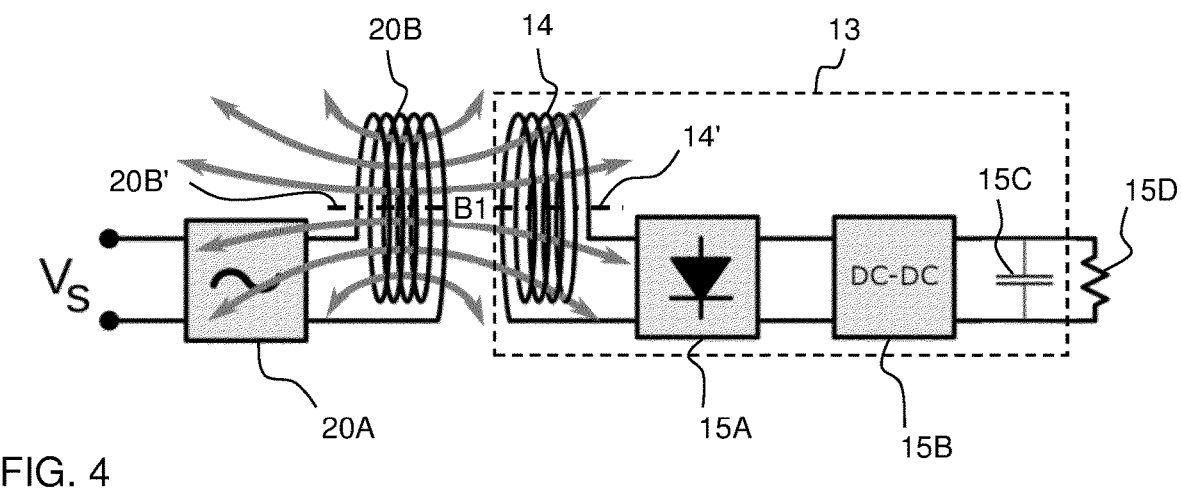
FIG. 4 is an illustration of an example power source arranged to harvest energy from the magnetic field generated by a drive coil of an electric motor.

The implementation of EEH in the sensor unit 10 will be further exemplified with reference to FIG. 4, which shows control electronics 20A (for example included in the controller part 20', FIG. 3) and a drive coil 20B (included in the actuator part 20", FIG. 3) of an electric motor. The control electronics 20A is operable to selectively energize the drive coil 20B to generate the time-varying magnetic field B1. In the illustrated example, the EEH power source 13 is arranged with its coil system 14 (here, a single receiving coil) in the magnetic field B1. By mutual induction, the magnetic field B1 will induce a time-varying or alternating current in the coil system 14, which thereby will acquire energy from the magnetic field B1. The power source 13 comprises electronic circuitry for conditioning the acquired energy so that it can be supplied for powering the sensor device 11 and the transmitter 12. Specifically, the time-varying potential generated at the output terminals of the coil system 14 is rectified and converted to a predefined voltage level by the electronic circuitry. In the illustrated example, the terminals of the coil system 14 are connected to a rectifier 15A. The rectifier 15A may be a low voltage-drop power rectifier, such as a diode bridge, for example a Schottky diode bridge. A DC-to-DC power converter 15B is arranged to receive a first DC voltage output by the rectifier 15A and convert the first DC voltage to a predefined second DC voltage, which is supplied to a storage 15C and to the power-consuming components 15D of the sensor unit, including the sensor device 11 and the transmitter 12 (FIG. 2). In some embodiments, the power converter 15B is a buck converter, for example a low-consumption step-down buck converter. At least part of the harvested energy is stored in a storage 15C to be available when needed for powering the components 15D. It is understood that part of the harvested energy may be consumed in real-time by the components 15D, for example if these have a non-zero default power consumption. In some embodiments, the storage 15C is or comprises a supercapacitor.

In some embodiments, the EEH power source 13 is tailored to the electric motor 20 to optimize the EEH performance. For example, a resonance frequency of a receiving circuit comprising the coil system 14 may be tailored ("tuned") to substantially coincide with a switching frequency of the current to the drive coil 20B. In another example, the dimension of the coil system 14 may be adapted to the dimensions of the drive coil 20B. Further, the coil system 14 may be tailored to the control strategy of the drive coil 20B as implemented by the control electronics 20A.

Such embodiments may be useful if the sensor unit 10 is to be used with a specific electric motor and a specific control strategy. However, food packaging machines are complex and advanced machinery that may include a variety of general and/or specialized electric motors. It may therefore be advantageous for the sensor unit 10 to be configured to harvest sufficient energy from electric motors of different types, dimensions, configurations, as well as different control strategies. Therefore, in some embodiments, the EEH power source 13 is configured and operated independently of the electric motor 20. Thus, the EEH power source 13 may be configured to be generically applicable to harvest energy from magnetic fields generated by electric motors in food packaging machines. In some embodiments, this may be achieved by configuring the EEH power source 13 to be responsive to magnetic fields over a contiguous range of frequencies of the magnetic field, i.e. with a substantial bandwidth. In some embodiments, this bandwidth is at least 10 Hz, 100 Hz, 1 kHz, 10 kHz or 100 kHz. Thereby, the EEH power source 13 may be capable of harvesting energy from a variety of electric motors and a variety of control strategies.

The amount of energy harvested by the EEH power source 13 decreases with distance to the electric motor 20. Thus, irrespective of the configuration of the EEH power source 13, it may be beneficial to mount the sensor unit 10 with its coil system 14 as close to the drive coil 20B as possible.

Further, if the drive coil 20B is stationary, the amount of harvested energy may be optimized by substantially aligning a symmetry axis of the coil system 14 with a symmetry axis of the drive coil 20B. An example is shown in FIG. 4, where the center axis 14' of the coil system 14 is aligned with the center axis 20B' of the drive coil 20B to ensure that as much as possible of the magnetic field B1 extends inside the coil system 14. Such alignment may be achieved by proper configuration of the mounting surface 17 (FIG. 2) in relation to the machine part 101 (FIG. 3) on which the sensor unit 10 is to be attached. In some embodiments, the mounting surface 17 may be adaptable to the machine part 101, for example by providing suitably shaped spacers or liners to be installed between the mounting structure 16 and the machine part 101.

Figure 5:
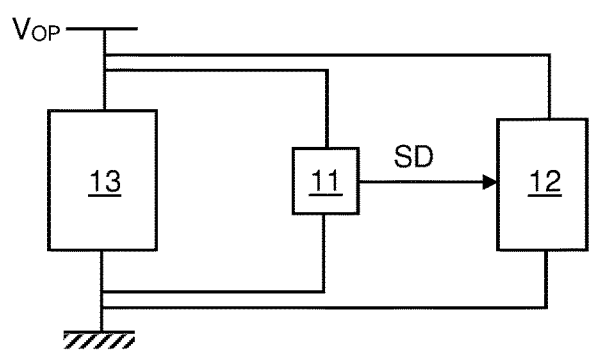
FIG. 5 is a block diagram of electric circuitry in an example sensor unit.

FIG. 5 is a schematic view of the sensor device 11 and the transmitter 12 as connected to the EEH power source 13, which is configured to supply a DC voltage $V_{OP}$, which corresponds to the above-mentioned second DC voltage. The solid arrow represents the provision of sensor data SD from the sensor device 11 to the transmitter 12.

In some embodiments, the EEH power source 13 may be configured to harvest a relatively modest amount of energy. For example, consider a sensor unit 10 with a sensor device 11 in the form of a miniaturized accelerometer. Such a commercially available accelerometer may have a power consumption of approximately 3 mW. Further, assume that the sensor unit 10 has a low-cost WiFi transmitter 12, which may have a power consumption of 400 mW when transmitting and less than 50 mW when active but not transmitting. When inactivated, such a WiFi transmitter 12 may have a power consumption close to zero. To reduce the power consumption of sensor units, it is conventional practice to buffer data internally of the sensor unit and only transmit data intermittently. Depending on data transfer speed of the transmitter 12 and the data rate from the sensor device 11, it may be sufficient to activate the transmitter 12 during a fraction of a second. Thereby, in this example, the total power consumption of the sensor unit 10 would be approximately 53 mW. Assuming an EEH capability of 100 µW for the EEH power source 13, which is a conservative estimate according to experimental data, the sensor unit 10 may be operable to measure environmental parameters for more than 160 seconds per day, while also intermittently transmitting measurement data to the computer 40. Clearly, even with such a modest EEH capability, the sensor unit 10 provides acceptable performance. It should also be noted that the total power consumption of the sensor unit 10 may be reduced significantly by use of a BLE transmitter or another low-power transmitter.

It may also be noted that the EEH approach offers practical advantages in terms of footprint and cost. For example, the coil system 14 may be directly implemented by conductive paths on a Printed Circuit Board (PCB). This may lower component cost and permit precise control of physical characteristics of the coil system 14, such as inductance and parasitic parameters. A sensor unit of small footprint may be achieved by integrating all electric components of the sensor unit 10 on a PCB. Further, flexible PCB technology may be exploited to achieve a one-board device with customizable shape for arranging the coil system 14 in the best possible position in relation to the respective electric motor in the packaging machine. Thus, in some embodiments, a flexible PCB containing at least the coil system 14 may define the mounting surface 16, which may be adjusted by deformation of the PCB when the sensor unit 10 is being installed in the packaging machine.

Figure 6A:
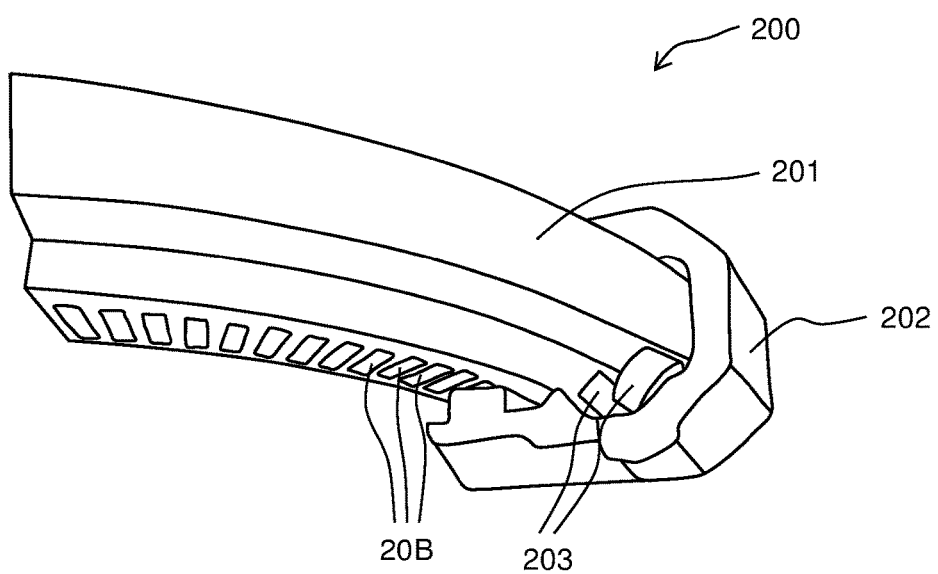
FIG. 6A is a perspective view of part of an example conveyor system comprising a linear motor.

The sensor units 10 described herein may be used in conjunction with linear motors, which are becoming increasingly common in food packaging machines for use in conveyor or transportation systems. Linear motors bring about significant simplification in terms of mechanical complexity compared to rotary motors. An example of a linear motor 200 adapted for use in a conveyor system is shown in FIG. 6A. The linear motor 200 comprises an elongated motor structure 201 in which several coils 20B are embedded along its extent. The coils 20B are managed and energized by an electronic controller (not shown, cf. controller part 20' in FIG. 3). The elongated motor structure 201 is denoted "rail" or "track" herein and forms the stator of the linear motor 200. The linear motor 200 further comprises one or more passive devices 202 (one shown), which correspond to rotors of rotary motors and are denoted "movers" or "carts" herein. The respective cart 202 is configured for movement along the rail 201. In the illustrated example, the cart 202 is C-shaped and arranged to engage the rail 201 from the side so that the cart 202 extends on three sides of the rail 201. Wheels or rollers 203 are arranged on the cart 202 to facilitate its sliding motion along the rail 201. In some implementations, one or more permanent magnets or soft iron cores (not shown) may be integrated in the structure of the cart 202. The motion of the individual cart 202 is enabled by the interaction between the magnetic field radiated by the energized coils 20B and the cart 202. Due to the nature of the linear motor 200, there are normally no cables attached to the carts 202. It is realized that a sensor unit 10 as described herein may be conveniently installed on a cart 202 for monitoring environmental parameters in this type of conveyor system.

Figure 6B:
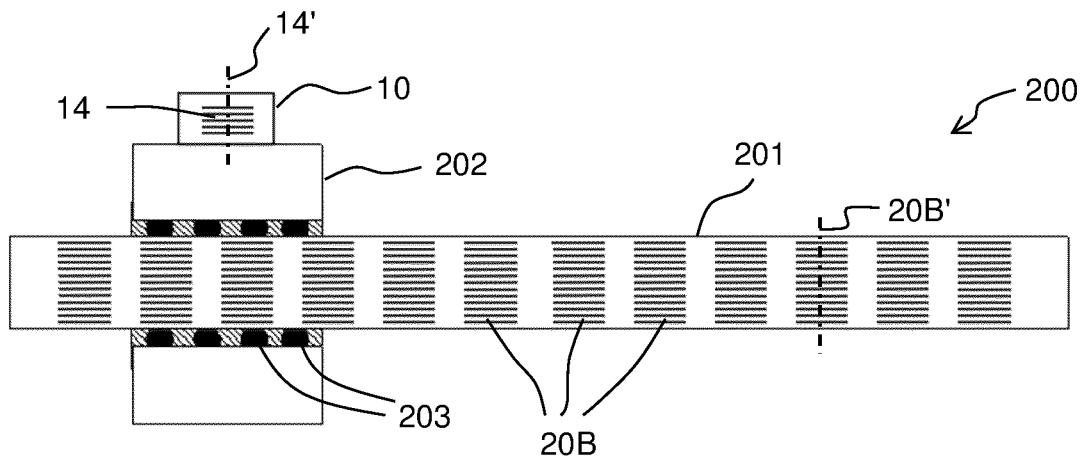
FIGS. 6B-6D are side views illustrating different installation locations of a sensor unit on a cart in such a conveyor system.
Figure 6C:
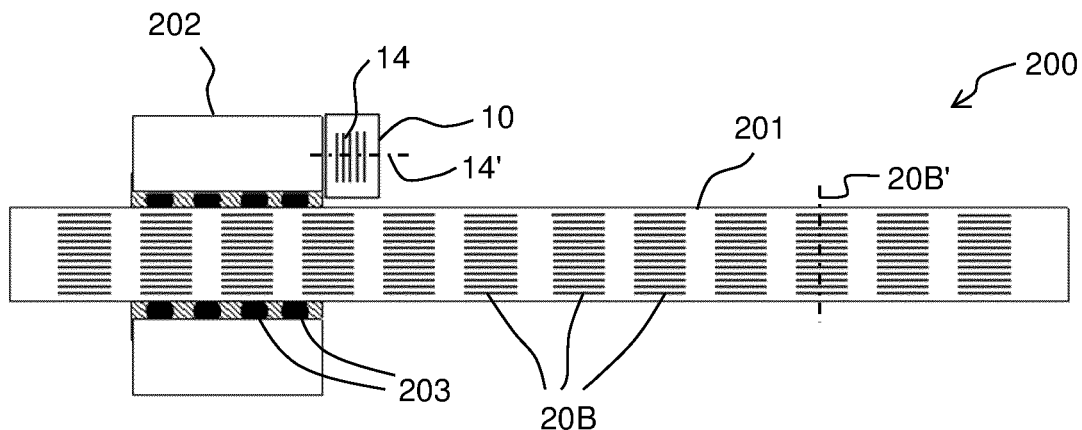
Figure 6D:
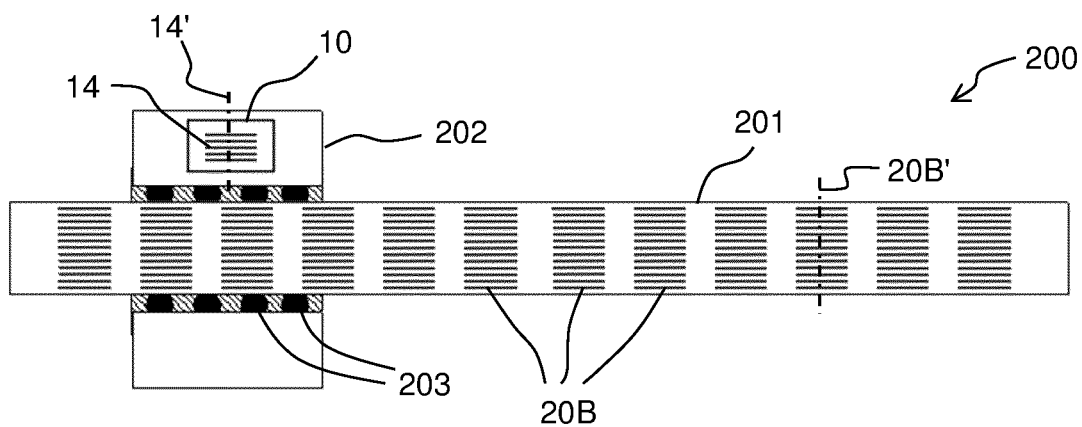

FIGS. 6B-6D are side views of a linear motor 200 of the type shown in FIG. 6A. The side views are taken in a transverse direction of the rail 201 towards the open end of the C-shaped cart 202 and show rollers 203 in the interface between the cart 202 and the rail 201 as well as drive coils 20B that are arranged with their symmetry axes 20B' extending transverse to the rail 201. FIGS. 6B-6D illustrate different placements of a sensor unit 10 on the cart 202. In FIG. 6B, the sensor unit 10 is attached onto the top portion of the cart 202 to be located above the drive coils 20B. In this example, the symmetry axis 14' of the receiving coil 14 is substantially parallel to the symmetry axes 20B' of the drive coils 20B, which causes the symmetry axis 14' to be substantially aligned with the symmetry axes 28B' as the cart 202 moves along the rail 201. This is believed to optimize the energy transfer to the receiving coil 14 from the magnetic field radiated by the drive coils 20B. In FIG. 6C, the sensor unit 10 is attached on the rear side of the top portion of the cart 202 to be located above the drive coils 20B. In this example, the symmetry axis 14' is arranged perpendicular to the symmetry axes 20B', which may be non-optimal for energy harvesting by the receiving coil 14 but may be desirable for other reasons, such as availability of mounting space, shielding from contamination or mechanical forces, proper positioning of the sensor device 11 to measure the environmental parameter(s), etc. In FIG. 6D, the sensor unit 10 is arranged on the lateral side of the top portion of the cart 202 to be located above the drive coils 20B with the symmetry axis 14' extending parallel to the symmetry axes 20B'. In this example, the sensor unit 10 may project beyond the rail 201 and the symmetry axis 14' may therefore not be aligned with the symmetry axes 20B' as the cart 202 moves along the rail 201. Thus, the energy harvesting may be less than optimal but, by analogy with FIG. 6C, the placement may be dictated by other considerations. FIGS. 6B-6D are only given as examples, and the sensor unit 10 may be attached at any location on the cart 202.

The invention claimed is:

1. A sensor unit for mounting in vicinity of an electric motor in a food packaging machine, said sensor unit comprising:
  at least one sensor device configured to generate sensor data representative of an environmental parameter of the food packaging machine,
  a wireless transmitter for transmitting the sensor data,
  a power source for providing energy to the at least one sensor device and the wireless transmitter,
  an energy storage component configured to store at least a portion of the energy harvested by the power source, and
  a housing comprising a mounting structure having a mounting surface, the mounting structure comprising through-holes configured to receive fasteners for attachment to the food packaging machine in the vicinity of the electric motor, wherein the at least one sensor device, the wireless transmitter, the power source, and the energy storage component are positioned in the housing, wherein the power source comprises at least one receiving coil configured to harvest energy from a magnetic field generated by the electric motor, wherein the power source is configured to harvest energy from the magnetic field over a contiguous range of frequencies of the magnetic field of at least 10 Hz, and wherein the power source is configured to generate a minimum of 100 μW of energy from the magnetic field generated by the electric motor.

2. The sensor unit of claim 1, wherein the at least one receiving coil is connected to a storage for at least part of the energy harvested from the magnetic field.

3. The sensor unit of claim 1, wherein the power source comprises at least one rectifier connected to the at least one receiving coil to generate a first DC voltage, and a DC-to-DC power converter configured to convert the first DC voltage to a predefined second DC voltage.

4. The sensor unit of claim 1, wherein the mounting surface is configured to, when the mounting surface is attached to the food packaging machine, substantially arrange a first symmetry axis of the at least one receiving coil in parallel with, and preferably in alignment with, a second symmetry axis of a drive coil in the electric motor.

5. The sensor unit of claim 1, wherein the power source is configured to harvest the energy from at least one of a first magnetic field radiated by a drive coil in the electric motor or a second magnetic field radiated by a controller of the electric motor.

6. The sensor unit of claim 5, wherein the controller is configured to repeatedly energize and deenergize the drive coil.

7. The sensor unit of claim 1, wherein the power source is configured and operated independently of the electric motor.

8. The sensor unit of claim 1, wherein the at least one receiving coil is implemented on a PCB.

9. A system for installation in a food packaging machine, comprising an electric motor and a sensor unit according to claim 1, which is separate from the electric motor.

10. The system of claim 9, further comprising a conveyor, wherein the conveyor defines a track and comprises a cart configured for movement along the track, the electric motor comprising a plurality of drive coils which are fixedly arranged along the track and are operable to generate a respective magnetic field to move the cart along the track, wherein the sensor unit is configured for attachment to the cart.

11. A food packaging machine, comprising an electric motor and a sensor unit according to claim 1, which is separate from the electric motor.

12. A sensor unit for mounting in vicinity of an electric motor in a food packaging machine, said sensor unit comprising:

at least one sensor device configured to generate sensor data representative of an environmental parameter of the food packaging machine, a wireless transmitter for transmitting the sensor data, a power source for providing energy to the at least one sensor device and the wireless transmitter, an energy storage component configured to store at least a portion of the energy harvested by the power source, and a housing comprising a mounting structure having a mounting surface, the mounting structure comprising through-holes configured to receive fasteners for attachment to the food packaging machine in the vicinity of the electric motor, wherein the at least one sensor device, the wireless transmitter, the power source, and the energy storage component, are positioned in the housing, wherein the power source comprises at least one receiving coil configured to harvest energy from a magnetic field generated by the electric motor, wherein the at least one sensor device is positioned outside of a housing of the electric motor.

13. The sensor unit of claim 12, wherein the at least one receiving coil is connected to a storage for at least part of the energy harvested from the magnetic field.

14. The sensor unit of claim 12, wherein the power source comprises at least one rectifier connected to the at least one receiving coil to generate a first DC voltage, and a DC-to-DC power converter configured to convert the first DC voltage to a predefined second DC voltage.

15. The sensor unit of claim 12, wherein the mounting surface is configured to, when the mounting surface is attached to the food packaging machine, substantially arrange a first symmetry axis of the at least one receiving coil in parallel with, and preferably in alignment with, a second symmetry axis of a drive coil in the electric motor.

16. The sensor unit of claim 12, wherein the power source is configured to harvest the energy from a first magnetic field radiated by a drive coil in the electric motor and a second magnetic field radiated by a controller of the electric motor.

* * * * *